United States Patent [19]

McGarvey

[11] Patent Number: 5,129,688

[45] Date of Patent: Jul. 14, 1992

[54] TORQUE REDUCING COUPLING FOR FACE SEAL FITTINGS

[75] Inventor: Raymond McGarvey, Bethesda, Md.

[73] Assignee: General Components, Inc., Rockville, Md.

[21] Appl. No.: 565,423

[22] Filed: Aug. 10, 1990

[51] Int. Cl.$^5$ ............................................. F16L 25/00
[52] U.S. Cl. ............................ 285/328; 285/353; 285/415; 285/923; 277/207 A; 277/1
[58] Field of Search ............. 285/413, 414, 415, 321, 285/388, 423, 353; 252/28, 29

[56] References Cited

U.S. PATENT DOCUMENTS

| | | | |
|---|---|---|---|
| 944,877 | 12/1909 | Koschinski | 285/388 |
| 1,675,808 | 7/1928 | Kliss | 285/388 X |
| 2,635,931 | 4/1953 | May | 285/321 X |
| 3,290,068 | 12/1966 | Jackson | 285/321 X |
| 3,405,957 | 10/1968 | Chakroff | 285/321 X |
| 3,929,358 | 12/1975 | Eckhardt | 285/415 X |
| 4,068,863 | 1/1978 | Lasko | 285/39 |
| 4,150,847 | 4/1979 | DeCenzo | 285/388 X |
| 4,557,839 | 12/1985 | Tubbs et al. | 252/29 X |
| 4,634,545 | 1/1987 | Zaleski et al. | 252/29 |
| 4,637,884 | 1/1987 | Miyazaki et al. | 252/29 X |
| 4,780,226 | 10/1988 | Sheets et al. | 252/29 X |
| 4,850,622 | 7/1989 | Suzuki | 285/321 X |

OTHER PUBLICATIONS

Feder, "Industry's Growing Romance With Diamonds", The New York Times, Feb. 21, 1990, p. C5.

*Primary Examiner*—Dave W. Arola
*Assistant Examiner*—Timothy Aberle
*Attorney, Agent, or Firm*—Lane, Aitken, & McCann

[57] ABSTRACT

In a face seal fitting between two conduits, one conduit is provided with an annular groove in which a two-piece ring makes a sliding fit. The ring is coated with a diamond low friction coating which facilitates sliding of the ring in the groove. The ring assembly performs the function of a flange and is engaged by a threaded coupling nut. As the coupling nut is turned to engage a second coupling nut and draw the conduits together, the nut also engages the two-piece ring which slides in the groove thereby reducing torque.

12 Claims, 1 Drawing Sheet

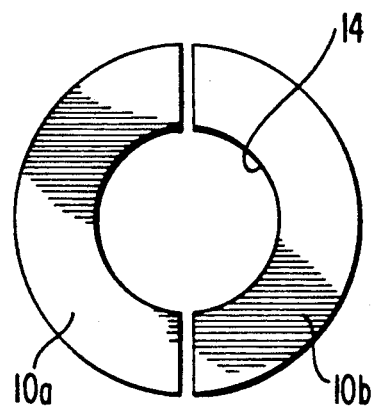
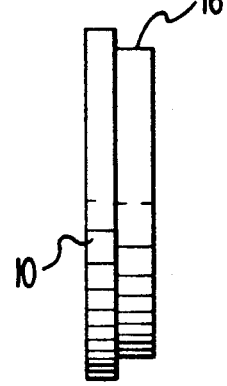
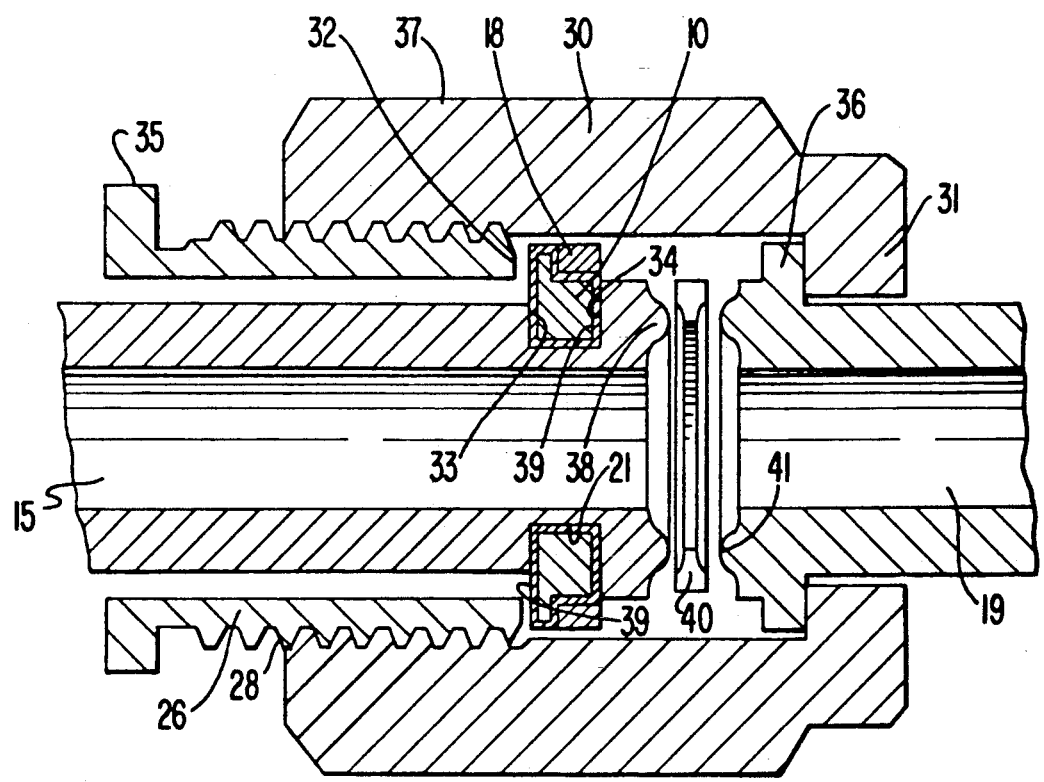

TORQUE REDUCING COUPLING FOR FACE SEAL FITTINGS

The present invention relates to conduits and more particularly to face seal connector fittings for use in pressurized systems in an ultra-clean environment.

BACKGROUND OF THE INVENTION

Prior art concerning face seal fittings does not recognize or address the problem of torque that can adversely affect the components of a fitting and is a factor in the introduction of undesirable particulate matter into a system. Torque is applied to a fitting by the rotation of threaded coupling nuts that engage flanges near the ends of conduits which are drawn together. In the prior art, torque applied to a flange or flange equivalent is transmitted to the seal components which typically consist of axial projecting annular integral sealing beads on the ends of each conduit and an annular gasket. In high temperature and in ultra-clean room applications all of the seal components are typically comprised of metal.

Various means have been developed in the prior art to ensure the position of the gasket is properly aligned with the integral beads of the conduits. If the conduits and gaskets are not properly aligned when the components are drawn together by coupling nuts, a gas tight seal is not achieved. The prior art developments focus on means to align and position the gasket and sealing beads to prevent the conduits from laterally moving to a position off the central axis of the conduits.

The present invention recognizes that torque on the fitting results in both lateral and rotational movement causing the misalignment of the fitting and uneven application of force to the gasket. Both rotational movement and lateral movement from the central axis can cause a faulty seal and the deterioration of the seal components subject to the forces. In addition to its contribution to improper sealing, the deterioration of the integral sealing beads and gasket can introduce undesirable particulate matter into an ultra-clean system. Microscopic examination reveals that scratches on the surfaces of the metal interfaces are reduced when the torque applied to the conduits in interconnecting the fittings is reduced. Further, the deterioration of the system's components requires increased maintenance and replacement parts resulting in more downtime and expense.

Accordingly it is desirable to provide a fitting in which the torque acting on the conduits of a face seal fitting are reduced.

An additional problem encountered with the coupling of conduits is that an integral flange on the conduit will prevent the slipping of a coupling nut over the end of which it is intended to engage. Thus, a threaded nut used to draw the components of a fitting together must be assembled by inserting the coupling device over the conduit from a free end. For components used in ultra-clean environments such as are required in the semi-conductor industry it is undesirable to assemble the coupling device in this manner because it requires that the free end of the conduit be connected and welded in the fluid system after the coupling nut has been assembled over the flanged component of the fitting requiring an increased length of the flanged component to permit the required welding with the coupling nut in place. Integral flanges of the prior art prevent a threaded coupling from slipping over the end of a conduit that is intended to be sealed.

Accordingly, the object of the invention is to construct a conduit fitting assembly that will reduce torque applied to a fitting while providing the additional advantage of allowing the coupling nut to be assembled by slipping the nut over the end of the conduit which is intended to be sealed.

Another object of the invention is to provide a conduit connection having a novel clamping and sealing structure, including a novel split ring with a diamond coating which rotates around a conduit in an annular groove thereby reducing torque forces on the conduit brought on by threaded coupling nuts.

Another object of the invention is to provide a conduit connector that is capable of assembly in a compact area.

Another object of the invention is provide a conduit connection suitable for use in conduits designed for use in ultra-clean environments such as those required in the semi-conductor industry.

A further object of the invention is to provide a method of sealing two conduits by a threaded coupling device which reduces the torque exerted on the conduits and the gasket member.

Further objects and advantages of the invention will be apparent from the following specification, appended claims and accompanying drawings.

BRIEF DESCRIPTION OF THE INVENTION

The subject invention comprises a coupling assembly that incorporates a removable two part split ring. The two semi-circular parts are assembled to form a ring and positioned on the end of a conduit. The two part ring fits into an annular groove machined around the circumference of a conduit and acts as a substitute for an integral flange. The dimensions of the two part ring when assembled are such that they form a precision sliding fit in the groove. The precision sliding fit is achieved by making the diameter of the groove slightly smaller than the inner diameter of the two part ring. A second retainer ring fits on a shoulder provided on the outer circumference of the two part ring assembly. The retainer ring engages and retains the semi-circular parts and holds the split ring in position on the conduit. After assembly, the split ring is free to rotate on the conduit within the groove. The sliding surfaces of the split ring are covered with a diamond or other coating which has a suitable hardness and low coefficient of friction. The face seal fitting consists of the two conduits each with an integral annular sealing bead which axially projects from the end of the conduit. A gasket made of stainless steel, nickel or other metal and accepts the sealing beads is aligned and positioned between the conduits. To draw the conduits together, male and female threaded coupling nuts which are assembled over conduits are engaged and turned so that they engage the two part ring and a flange located on the opposite conduit end. The rotational forces acting on the sealing components are diminished due to the fact that the two part ring, acting as a flange, can freely rotate within the annular groove and the low friction coating decreases frictional forces between the ring and the surfaces on which the ring slides.

In practice, the threaded male coupling is first slipped over the end of the conduit which is to be joined together and positioned so that the internal annular groove is accessible. Next, two halves of the split ring are assembled in the groove to form a substitute for an integral flange. Next the retaining ring is positioned on the external annular shoulder of the split ring to axially hold the two pieces of the ring together. The male coupling nut is rotated so that its threads engage the threads of the female coupling nut on the opposing fitting conduit and draw the fitting together. The male coupling nut engages the planar surface of the two-piece split ring and transmits an axial force to the ring which is in turn transmitted to the bearing seals of the conduit and gasket. Torque on the fitting components is reduced because the split ring is allowed to rotate in the groove and the male coupling nut can slide over the planar surface of the two part ring with reduced resistance.

BRIEF DESCRIPTION OF THE DRAWINGS

FIG. 1 is an elevation view of the two part split ring of the invention;

FIG. 2 is a side elevation view of the two part split ring; and

FIG. 3 is an axial sectional view of a face seal fitting showing the two part split ring, the conduits with sealing beads, gasket and coupling device.

DESCRIPTION OF A PREFERRED EMBODIMENT

As shown in the FIGS. 1 and 2 the split ring 10 comprises two semi-circular parts 10a and 10b. The ring 10 has an exterior annular shoulder 16 which as shown in FIG. 3 can accept a retaining ring 18. The retaining ring 18 preferably is constructed of a heat shrinkable metal, which decreases in diametrical size when heated. The ring 18 is slipped over the two-piece ring 10 and on the external shoulder 16 and then is heated to shrink the ring 18 on the shoulder so that the ring 18 provides uniform clamping pressure to hold the two-piece ring together. Such heat shrinkable rings are sold under the trademark UNILOK by RayChem, Inc. Alternatively, the ring 18 may be force fit on the shoulder 16.

FIG. 3 shows the split ring assembly in place on a typical face seal fitting. The fitting is depicted at a position before a seal is achieved. The ring 10 is positioned in the annular groove 21 machined in the wall of a conduit 15 adjacent to the end of the conduit. The groove 21 has a cylindrical bottom surface and planar radial side surfaces 33 and 34. The two pieces of the ring 10 are assembled in the groove 21 and then locked in place by applying the retaining ring 18 on the shoulder 16. The diameter of the cylindrical surface 14 of the ring 10 is slightly larger than that of the bottom cylindrical surface of the annular groove 21 in the conduit 15 and makes a precision sliding fit with this surface. The conduits 15 and 19 are drawn together by turning male and female threaded coupling nuts 26 and 30, which have hexagonal heads 35 and 37 respectively for accepting wrenches for the application of torque. The female coupling nut 30 has a shoulder 31 which engages a flange 36 formed on the conduit 19. When the male nut 26 is turned relative to the female nut 30 with its external threads 28 engaging the internal threads on female nut 30, the seat 32 on the end of the male nut 26 moves axially towards the two-piece ring 10. As the male nut screws into the female nut it draws annular sealing beads 38 and 41 on the end of faces of conduits 15 and 19 into engagement with gasket 40, which thereby is brought into sealing engagement with the sealing beads 38 and 41. When the seat 32 contacts the ring 10, both rotational and axial forces are exerted on the ring 10. The ring 10 will tend to transmit these forces to the radial surface 34 of the groove 21. The rotational forces however are diminished due to the ability the ring 10 to slide in the groove 21. The ability of the ring 10 to rotate with the application of the forces diminishes the torque acting on the conduit and gasket. Axial forces are completely transmitted to the sealing beads 38 located on the ends of the conduits. The sealing beads of the conduit are drawn together with diminished torque applied to the conduits and form an improved seal with the surface of the gasket 40. The radial surface of the ring 10 engaging the radial surface 34 of the groove is provided with a hard low friction coating 39 to facilitate sliding of the ring with respect to the conduit. The coating 39 is preferably a diamond coating which provides a lower coefficient of friction than the uncoated stainless steel of the ring 10 itself. The other sliding surfaces of the ring 10 making sliding engagement preferably are also similarly coated. For manufacturing convenience, the entire external surface of the ring 10 is coated with the diamond material. Thus, the inclusion of the rotatable and coated two-piece ring 10 diminishes the torque acting on the gasket, conduits and conduit sealing beads. Alternatively, the surfaces of the groove 21 could be provided with the low friction coating.

Either of the conduits 15 or 19 could be grooved to receive the two-piece ring that is the subject of the invention. For instance, the shoulder 31 of the female nut could engage the split ring assembly. A conduit having integral external thread could replace the male nut. A split ring assembly could be simultaneously used on both conduits of the fitting to further reduce the torque applied to the conduits.

The ring 10, instead of being a two-piece ring held in place by the retaining ring 18, could be a one-piece heat shrinkable ring such as the UNILOK ring employed for the retaining ring 18. Such rings are capable of shrinking their inside diameter by 5.5%. In this embodiment, the outer diameter of the conduit 15 would be uniform on each side of the groove 21 receiving the ring 10. The groove 21 would be made relatively shallow and be sized so that when the ring is shrunk by heating, it will make a precision sliding fit with the bottom of the groove. In this embodiment, a low friction coating may be applied to the surfaces of the groove 21 to facilitate sliding of the ring in the groove.

The above description of preferred embodiments of the present invention is considered illustrative rather than limiting. It is contemplated that various modifications can be made without departing from the spirit and scope of the present invention, which is defined in the appended claims.

I claim:

1. A face seal fitting comprising:
   a first conduit with an annular groove extending radially into the conduit, said groove having an annular bottom surface, said first conduit having annular sealing means on an end thereof,
   a second conduit with an annular sealing means on an end thereof adapted to be connected to said first conduit in a sealed connection,
   a ring positioned in said groove,
   a threaded coupling nut encircling said first conduit and engaging said ring,
   coupling means on said second conduit for threadedly engaging said coupling nut, said threaded coupling nut and said coupling means comprising means to draw said first and second conduits together in a sealed connection by said threaded coupling nut turning in engagement with said coupling means while engaging said ring, and means for preventing torque from being applied to said conduits by said threaded coupling nut, said torque preventing means comprising an inner annular surface on said ring sized to make a sliding fit with the bottom surface of the groove and a low friction coating interposed between said ring and said groove.

2. A face seal fitting as recited in claim 1, wherein said ring is a split ring of at least two arcuate parts.

3. The face seal fitting as recited in claim 2 further comprising a retaining ring on the outer circumference of said ring to hold said ring together in said groove.

4. The face seal fitting as recited in claim 2 whereby said split ring further comprises two semi-circular parts.

5. The face seal fitting as recited in claim 1 wherein said low friction coating is provided on a surface of said ring where said ring is in sliding engagement with a radial surface of said groove.

6. The face seal fitting recited in claim 5 wherein said low friction coating is applied to a radial surface in sliding engagement with a radial surface of said groove on the opposite side of said split ring from the side engaged by said threaded coupling nut.

7. The face seal fitting as recited in claim 5, wherein said coating is a diamond coating.

8. The face seal fitting as recited in claim 5, wherein said coating is provided on all surfaces of said ring which make a sliding engagement when said first and second conduits are being drawn together.

9. The face seal fitting as recited in claim 8, wherein the entire surface of said ring is covered with said low friction coating.

10. The face seal fitting as recited in claim 1, wherein a gasket is sandwiched between said annular sealing means.

11. A method of operation of a face seal fitting wherein the face seal fitting comprises a first conduit with an annular groove extending radially into said first conduit and having annular sealing means on an end thereof, a second conduit with an annular sealing means on an end thereof adapted to be connected to said first conduit in a sealed connection, a ring positioned in said groove and sized to make a sliding fit with said groove, a threaded coupling nut encircling said first conduit and engaging said ring and coupling means on the second conduit for threadedly engaging said coupling nut; comprising:

turning said coupling nut in threaded engagement with said coupling means while engaging said ring with said coupling nut to draw the annular sealing means on said first conduit into a sealed connection with the annular sealing means on said second conduit, and rotationally sliding said ring in said groove as said threaded coupling nut is turned in engagement with said ring to prevent the application of torque to said sealed connection from the turning action of said threaded coupling nut.

12. A face seal fitting comprising:

a first conduit with an annular groove extending radially into the conduit, said first conduit having annular sealing means on an end thereof, a second conduit with an annular sealing means on an end thereof adapted to be connected to said first conduit in a sealed connection, a ring positioned in said groove, a threaded coupling nut encircling said first conduit and engaging said ring, coupling means on said second conduit for threadedly engaging said coupling nut, said threaded coupling nut and said coupling means comprising means to draw said first and second conduits together in a sealed connection by said threaded coupling nut turning in engagement with said coupling means while engaging said ring, and means for preventing torque from being applied to said conduits by said threaded coupling nut, said torque preventing means comprising a radial surface on said ring, said radial surface making a sliding engagement with a radial surface of said groove, and a low friction coating on said radial surface of said ring.

* * * * *